(12) United States Patent
Cha

(10) Patent No.: US 12,375,803 B2
(45) Date of Patent: Jul. 29, 2025

(54) IMAGE SENSOR, IMAGE PROCESSING SYSTEM, AND OPERATING METHOD OF THE IMAGE PROCESSING SYSTEM

(71) Applicant: SK hynix Inc., Icheon-si (KR)

(72) Inventor: Su Ram Cha, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 107 days.

(21) Appl. No.: 18/190,852

(22) Filed: Mar. 27, 2023

(65) Prior Publication Data
US 2024/0089595 A1   Mar. 14, 2024

(30) Foreign Application Priority Data
Sep. 14, 2022 (KR) .................. 10-2022-0115576

(51) Int. Cl.
*H04N 23/667* (2023.01)
*H04N 23/11* (2023.01)
*H04N 23/84* (2023.01)
*H04N 25/131* (2023.01)
*H04N 25/702* (2023.01)

(52) U.S. Cl.
CPC ........... *H04N 23/667* (2023.01); *H04N 23/11* (2023.01); *H04N 23/843* (2023.01); *H04N 25/131* (2023.01); *H04N 25/702* (2023.01)

(58) Field of Classification Search
CPC .... H04N 23/667; H04N 23/841; H04N 23/11; H04N 25/131
See application file for complete search history.

(56) References Cited

U.S. PATENT DOCUMENTS

| | | | |
|---|---|---|---|
| 3,971,065 A | 7/1976 | Bayer | |
| 9,535,197 B2 | 1/2017 | Cha et al. | |
| 10,855,959 B2 | 12/2020 | Cha et al. | |
| 2007/0153335 A1* | 7/2007 | Hosaka | H04N 23/843 358/463 |
| 2014/0253808 A1 | 9/2014 | Tachi | |
| 2016/0154151 A1 | 6/2016 | Cha et al. | |
| 2017/0134704 A1* | 5/2017 | Otsubo | H04N 23/76 |
| 2019/0139189 A1* | 5/2019 | Srinivasamurthy | G06T 3/4007 |
| 2019/0222812 A1* | 7/2019 | Cha | H04N 25/134 |
| 2020/0145641 A1* | 5/2020 | Takahashi | H04N 25/44 |
| 2022/0021857 A1 | 1/2022 | Cha | |

FOREIGN PATENT DOCUMENTS

WO   2014081107 A1   5/2014

* cited by examiner

*Primary Examiner* — Zhubing Ren
(74) *Attorney, Agent, or Firm* — WILLIAM PARK & ASSOCIATES LTD.

(57) ABSTRACT

Disclosed is an image sensor including a pixel array having a pixel pattern in which first to fourth 2×2 pixel groups are arranged in a clockwise direction, one infrared pixel is arranged in each of two 2×2 pixel groups that are not adjacent to each other, the same green pixels are arranged in a first diagonal direction, and red pixels and blue pixels are arranged in half in a second diagonal direction crossing the first diagonal direction, in a 4×4 unit pixel group.

9 Claims, 5 Drawing Sheets

IMAGE SENSOR, IMAGE PROCESSING SYSTEM, AND OPERATING METHOD OF THE IMAGE PROCESSING SYSTEM

CROSS-REFERENCE TO RELATED APPLICATION

This application claims priority under 35 U.S.C. § 119(a) to Korean Patent Application No. 10-2022-0115576, filed on Sep. 14, 2022, in the Korean Intellectual Property Office, which is incorporated herein by reference in its entirety.

BACKGROUND

1. Technical Field

Various embodiments of the present disclosure relate to a data semiconductor circuit, and more particularly, to an image sensor, an image processing system, and an operating method of the image processing system.

2. Related Art

Recently, a computer environment paradigm has shifted to ubiquitous computing systems, which enables a computer system to be used anywhere and anytime. As a result, the use of portable electronic devices, such as mobile phones, digital cameras and notebook computers, has been increasing rapidly.

Image sensing devices widely used in the electronic devices are devices for capturing images using the property of a semiconductor which reacts to light. Image sensing devices may be roughly classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

In accordance with an embodiment, a pixel array having a an image sensor may include: a pixel pattern in which first to fourth 2×2 pixel groups are arranged in a clockwise direction, one infrared pixel is arranged in each of two 2×2 pixel groups that are not adjacent to each other, the same green pixels are arranged in a first diagonal direction, and red pixels and blue pixels are arranged in half in a second diagonal direction crossing the first diagonal direction, in a 4×4 unit pixel group.

In accordance with an embodiment, an image processing system may include: an image sensor suitable for sensing an optical image of a subject and outputting image data; an image processing device suitable for receiving the image data, processing a received image according to a mode operation, and providing an output image; and a display device suitable for displaying the output image, wherein the image sensor may include a pixel array having a pixel pattern in which one infrared pixel is arranged in each of two 2×2 pixel groups that are not adjacent to each other among first to fourth 2×2 pixel groups, the same green pixels are arranged in a first diagonal direction, and red pixels and blue pixels are arranged in half in a second diagonal direction crossing the first diagonal direction, in a 4×4 unit pixel group.

In accordance with an embodiment, an operating method of an image processing system including an image sensor may include: determining whether the image processing system is in a depth mode, sampling an infrared pixel in a pixel pattern of a pixel array included in the image sensor and obtaining three dimensional (3D) depth information on the basis of the sampled infrared pixel when the image processing system is in the depth mode, determining whether the image processing system is in a high illuminance mode or a low illuminance mode when the image processing system is not in the depth mode, executing a remosaic mode and converting an RGW-IR pattern into a Bayer pattern in the high illuminance mode, and executing a 2-sum mode and generating a signal-to-noise ratio in the low illuminance mode.

DETAILED DESCRIPTION

Various embodiments of the present disclosure are described below with reference to the accompanying drawings, in order to describe in detail the present disclosure so that those with ordinary skill in art to which the present disclosure pertains may carry out the technical spirit of the present disclosure.

Various embodiments of the present disclosure are directed to an image sensor, an image processing system, and an operating method of the image processing system, which may selectively process three modes such as a depth mode, a remosaic mode and a 2-sum mode according to operating conditions, and thus generate improved image data.

Particularly, in an embodiment, in the depth mode, 12.5% of infrared pixels can be arranged in an RGB Bayer format, and only the infrared pixels can be sampled to obtain depth information. In an embodiment, in a high illuminance condition, the remosaic mode can be executed, which makes it possible to output image data in the Bayer format with the same resolution as image data input, and in a low illuminance condition, the same color pixels can be summated according to the 2-sum mode, which makes it possible to improve a signal-to-noise ratio.

These technical problems obtainable from the present disclosure are not limited to those described herein, and other technical problems not described herein will be apparently understood by those skilled in the art, to which the present disclosure pertains, from the following description.

Figure 1:
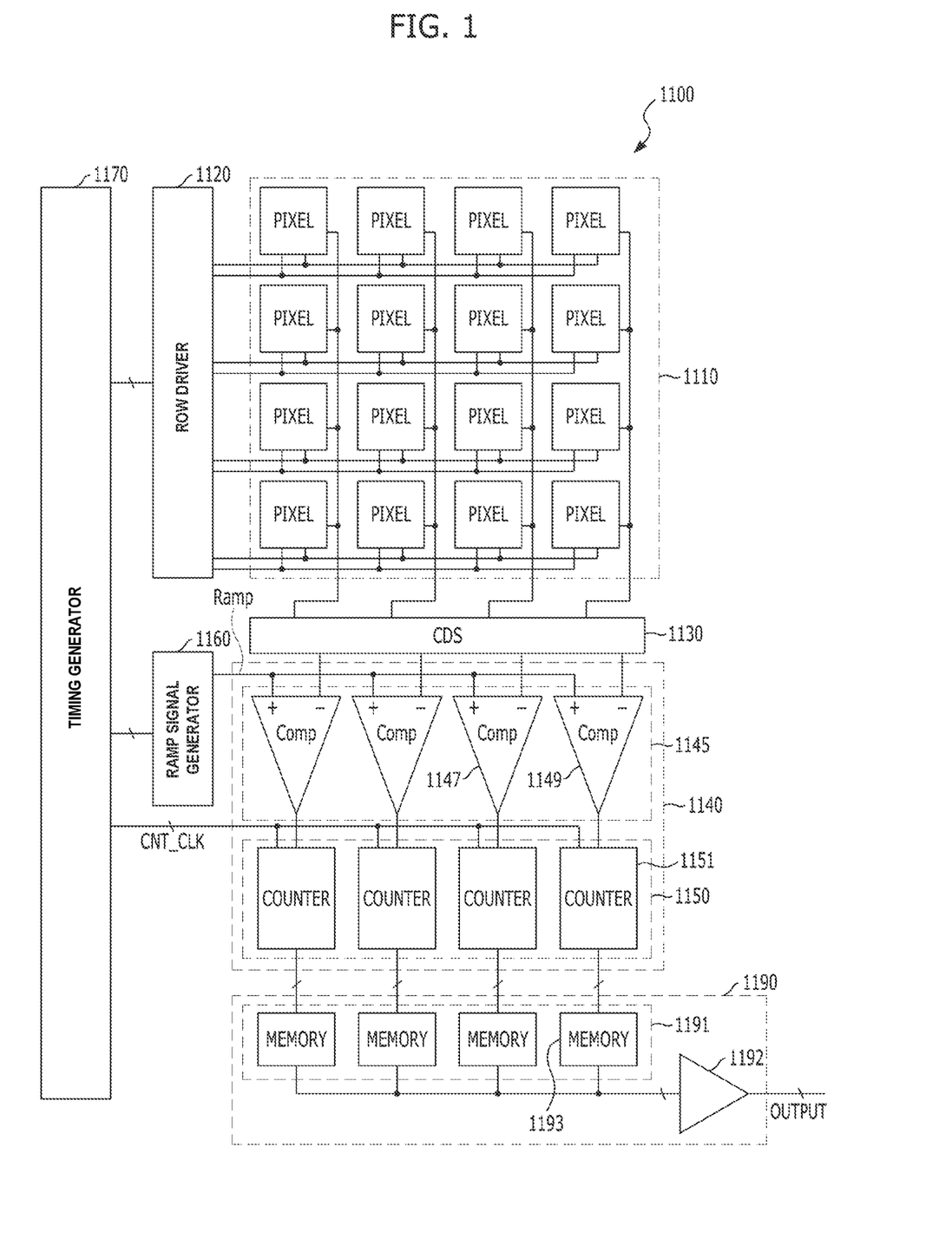
FIG. 1 is a block diagram illustrating an image sensor including a pixel array in which a pixel pattern is arranged, in accordance with an embodiment.

Hereinafter, an image sensor including a pixel array in which a pixel pattern is arranged according to an embodiment of the present disclosure is described with reference to FIGS. 1 to 5. FIG. 1 is a block diagram illustrating an image sensor 1100 including a pixel array 1110 in which a pixel pattern is arranged, in accordance with an embodiment.

Referring to FIG. 1, the image sensor 1100 includes the pixel array 1110, a row driver 1120, a correlated double sampling (CDS) circuit 1130, an analog-to-digital conversion (ADC) circuit 1140, a counter circuit 1150, a ramp signal generator 1160, and a buffer 1190.

In a 4×4 unit pixel group, the pixel array 1110 may include a pixel pattern in which first to fourth 2×2 pixel groups are arranged in a clockwise direction, one infrared pixel is arranged in each of two 2×2 pixel groups that are not adjacent to each other, green pixels are arranged in a first diagonal direction, and red pixels and blue pixels are arranged in half in a second diagonal direction crossing the first diagonal direction.

The pixel pattern arranged in the pixel array 1110 is described in detail below with reference to FIGS. 2 to 5.

Each of the plurality of pixels senses incident light, and outputs an image reset signal and an image signal to the correlated double sampling circuit 1130.

The row driver 1120 drives the pixel array 1110 in units of rows. For example, the row driver 1120 may generate a selection signal for selecting any one row from among a plurality of rows. Each of the plurality of rows includes a plurality of pixels.

The correlated double sampling circuit 1130 performs a correlated double sampling operation on each of the received image reset signal and image signal.

The analog-to-digital conversion circuit 1140 outputs comparison signals by comparing a ramp signal Ramp, which is output from the ramp signal generator 1160, with correlated double sampled signals, which are output from the correlated double sampling circuit 1130, and outputs count values to the buffer 1190 by counting level transition time of the comparison signals according to a clock signal CNT_CLK.

The correlated double sampling circuit 1130 performs the correlated double sampling operation on each of the received image reset signal and image signal. The analog-to-digital conversion circuit 1140 output comparison signals by comparing a ramp signal Ramp, which is output from the ramp signal generator 1160, with correlated double sampled signals, which are output from the correlated double sampling circuit 1130, and outputs count values to the buffer 1190 by counting level transition time of the comparison signals according to a clock signal CNT_CLK.

The analog-to-digital conversion circuit 1140 includes a comparison circuit 1145 and the counter circuit 1150. The comparison circuit 1145 includes a plurality of comparators Comp. Each of the plurality of comparators Comp is connected to the correlated double sampling circuit 1130 and the ramp signal generator 1160. Each of a plurality of output signals output from the correlated double sampling circuit 1130 is input to a first input terminal, for example, a (−) input terminal, of each of the plurality of comparators Comp, and the ramp signal Ramp output from the ramp signal generator 1160 is input to a second input terminal, for example, a (+) input terminal, of each of the plurality of comparators Comp.

Each of the plurality of comparators Comp receives each of the output signals output from the correlated double sampling circuit 1130 and the ramp signal Ramp output from the ramp signal generator 1160, compares each of the output signals with the ramp signal Ramp, and outputs the comparison signals.

The ramp signal generator 1160 may operate under the control of a timing generator 1170.

The counter circuit 1150 includes a plurality of counters 1151. The plurality of counters 1151 is connected to output terminals of the plurality of comparators Comp, respectively. The counter circuit 1150 counts the level transition time of the comparison signals according to the clock signal CNT_CLK output from the timing generator 1170, and outputs digital signals, that is, the count values. In other words, the counter circuit 1150 outputs a plurality of digital image signals. Each of the plurality of counters 1151 may be implemented as an up/down counter or a bit-wise inversion counter.

The ramp signal generator 1160 may generate the ramp signal Ramp under the control of the timing generator 1170, and provide the generated ramp signal Ramp to the comparison circuit 1145.

The timing generator 1170 generates at least one clock signal CNT_CLK for controlling an operation of each of the row driver 1120, the correlated double sampling circuit 1130, the analog-to-digital conversion circuit 1140 and the ramp signal generator 1160.

The buffer 1190 stores the plurality of digital image signals output from the analog-to-digital conversion circuit 1140, and outputs the amplified digital image signals. The buffer 1190 includes a memory unit 1191 and a sense amplifier 1192. The memory unit 1191 includes a plurality of memories 1193 for storing the count values output from the plurality of counters 1151 and the plurality of image signals.

The sense amplifier 1192 amplifies the plurality of image signals according to the count values output from the memory unit 1191, and outputs the amplified image signals.

Figure 2:
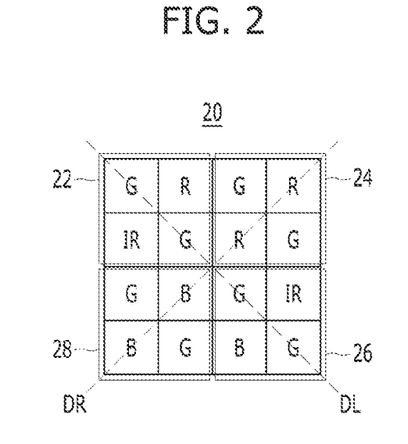
FIG. 2 illustrates a pixel pattern arranged in a pixel array included in an image sensor, in accordance with an embodiment.

FIG. 2 illustrates a pixel pattern arranged in a pixel array included in an image sensor, in accordance with an embodiment.

Referring to FIG. 2, the pixel pattern arranged in the pixel array included in the image sensor according to the present embodiment includes a 4×4 unit pixel group 20. The 4×4 unit pixel group 20 may include a first 2×2 pixel group 22, a second 2×2 pixel group 24, a third 2×2 pixel group 26 and a fourth 2×2 pixel group 28 in a clockwise direction, and a green pixel G may be arranged as a first pixel at the upper left in the 4×4 unit pixel group 20.

In the first 2×2 pixel group 22, the green pixels G may be arranged in a first diagonal direction DL, and an infrared pixel IR and a red pixel R may be arranged in a second diagonal direction DR.

In the second 2×2 pixel group 24, the green pixels G may be arranged in the first diagonal direction DL, and the red pixels R may be arranged in the second diagonal direction DR.

In the third 2×2 pixel group 26, the green pixels G may be arranged in the first diagonal direction DL, and a blue pixel B and the infrared pixel IR may be arranged in the second diagonal direction DR.

In the fourth 2×2 pixel group 28, the green pixels G may be arranged in the first diagonal direction DL, and the blue pixels B may be arranged in the second diagonal direction DR.

Figure 3:
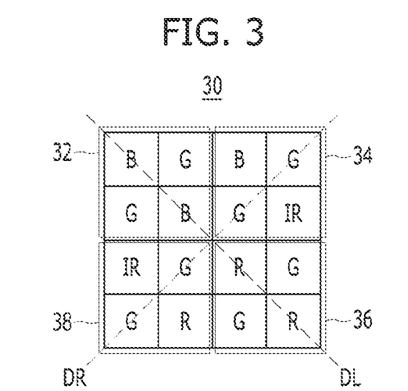
FIG. 3 illustrates a pixel pattern arranged in a pixel array included in an image sensor, in accordance with another embodiment.

FIG. 3 illustrates a pixel pattern arranged in a pixel array included in an image sensor, in accordance with another embodiment.

Referring to FIG. 3, the pixel pattern arranged in the pixel array included in the image sensor according to the present embodiment includes a 4×4 unit pixel group 30. The 4×4 unit pixel group 30 may include a first 2×2 pixel group 32, a second 2×2 pixel group 34, a third 2×2 pixel group 36 and a fourth 2×2 pixel group 38 in a clockwise direction, and a blue pixel B may be arranged as a first pixel at the upper left in the 4×4 unit pixel group 30.

In the first 2×2 pixel group 32, the blue pixels B may be arranged in a first diagonal direction DL, and green pixels G may be arranged in a second diagonal direction DR.

In the second 2×2 pixel group 34, the blue pixel B and an infrared pixel IR may be arranged in the first diagonal direction DL, and the green pixels G may be arranged in the second diagonal direction DR.

In the third 2×2 pixel group 36, red pixels R may be arranged in the first diagonal direction DL, and the green pixels G may be arranged in the second diagonal direction DR.

In the fourth 2×2 pixel group 38, the infrared pixel IR and the red pixel R may be arranged in the first diagonal direction DL, and the green pixels G may be arranged in the second diagonal direction DR.

Figure 4:
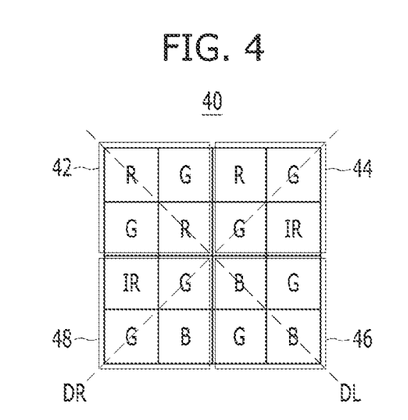
FIG. 4 illustrates a pixel pattern arranged in a pixel array included in an image sensor, in accordance with another embodiment.

FIG. 4 illustrates a pixel pattern arranged in a pixel array included in an image sensor, in accordance with another embodiment.

Referring to FIG. 4, the pixel pattern arranged in the pixel array included in the image sensor according to the present embodiment includes a 4×4 unit pixel group 40. The 4×4 unit pixel group 40 may include a first 2×2 pixel group 42, a second 2×2 pixel group 44, a third 2×2 pixel group 46 and a fourth 2×2 pixel group 48 in a clockwise direction, and a red pixel R may be arranged as a first pixel at the upper left in the 4×4 unit pixel group 40.

In the first 2×2 pixel group 42, the red pixels R may be arranged in a first diagonal direction DL, and green pixels G may be arranged in a second diagonal direction DR.

In the second 2×2 pixel group 44, the red pixel R and an infrared pixel IR may be arranged in the first diagonal direction DL, and the green pixels G may be arranged in the second diagonal direction DR.

In the third 2×2 pixel group 46, blue pixels B may be arranged in the first diagonal direction DL, and the green pixels G may be arranged in the second diagonal direction DR.

In the fourth 2×2 pixel group 48, the infrared pixel IR and the blue pixel B may be arranged in the first diagonal direction DL, and the green pixels G may be arranged in the second diagonal direction DR.

Figure 5:
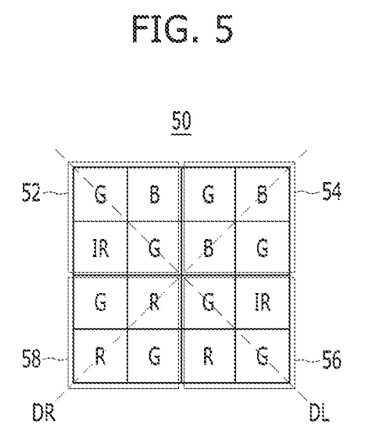
FIG. 5 illustrates a pixel pattern arranged in a pixel array included in an image sensor, in accordance with another embodiment.

FIG. 5 illustrates a pixel pattern arranged in a pixel array included in an image sensor, in accordance with another embodiment.

Referring to FIG. 5, the pixel pattern arranged in the pixel array included in the image sensor according to the present embodiment includes a 4×4 unit pixel group 50. The 4×4 unit pixel group 50 may include a first 2×2 pixel group 52, a second 2×2 pixel group 54, a third 2×2 pixel group 56 and a fourth 2×2 pixel group 58 in a clockwise direction, and a green pixel G may be arranged as a first pixel at the upper left in the 4×4 unit pixel group 50.

In the first 2×2 pixel group 52, the green pixels G may be arranged in a first diagonal direction DL, and an infrared pixel IR and a blue pixel B may be arranged in a second diagonal direction DR.

In the second 2×2 pixel group 54, the green pixels G may be arranged in the first diagonal direction DL, and the blue pixels B may be arranged in the second diagonal direction DR.

In the third 2×2 pixel group 56, the green pixels G may be arranged in the first diagonal direction DL, and a red pixel R and the infrared pixel IR may be arranged in the second diagonal direction DR.

In the fourth 2×2 pixel group 58, the green pixels G may be arranged in the first diagonal direction DL, and the red pixels R may be arranged in the second diagonal direction DR.

Figure 6:
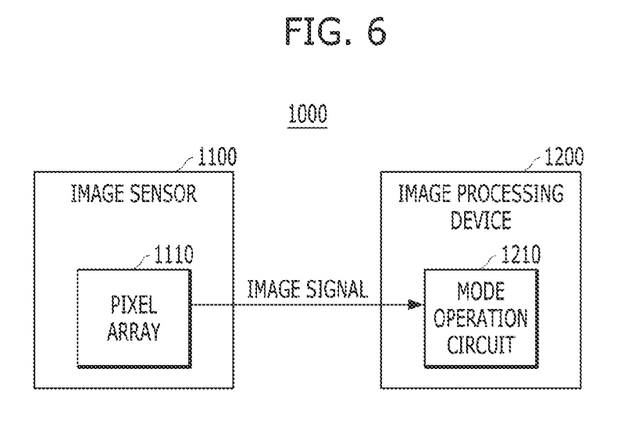
FIG. 6 is a block diagram illustrating an image processing system, in accordance with another embodiment.

Hereinafter, an image processing system according to another embodiment of the present disclosure is described with reference to FIG. 6. FIG. 6 is a block diagram illustrating an image processing system 1000, in accordance with another embodiment.

Referring to FIG. 6, the image processing system 1000 according to the present embodiment includes an image sensor 1100 and an image processing device 1200.

The image sensor 1100 may include a pixel array 1110 having a pixel pattern applied to FIGS. 1 to 5, and output image data by sensing an optical image of a subject.

The pixel array 1110 may include a pixel pattern in which, in the 4×4 unit pixel group included in the pixel pattern applied to FIGS. 1 to 5, first to fourth 2×2 pixel groups are arranged in a clockwise direction, one infrared pixel is arranged in each of two 2×2 pixel groups that are not adjacent to each other, the same green pixels are arranged in a first diagonal direction DL, and red pixels and blue pixels are arranged in half in a second diagonal direction DR crossing the first diagonal direction DL.

A detailed description of the pixel pattern is omitted since the pixel pattern has been described above with reference to FIGS. 1 to 5.

The pixel array 1110 may include a plurality of pixels. The pixels may refer to pixel data, and have an RGB data format, a YUV data format or a YCbCr data format, but the present disclosure is not limited thereto.

The RGB data format may be an additive color model in which a red color, a blue color and a green color of light are added together in various ways to reproduce a broad array of colors. The YUV data format may define one luminance component (Y) meaning physical linear-space brightness, and two chrominance components, called U (bule projection) and V (red projection) respectively. It can be converted to and from the RGB data format and with different color spaces. The YCbCr data format may define one luminance component (Y), and two chrominance components, called Cb (blue-difference chroma) and Cr (red-difference chroma). The YCbCr data format may be defined by a mathematical coordinate transformation from an associated RGB data format and a white point.

The image processing device 1200 may include a mode operation circuit 1210, and generate image data corresponding to a captured image on the basis of an image signal output from the image sensor 1100. The generated image data may have a pattern different from a color filter pattern of the pixel array 1110.

The mode operation circuit 1210 may generate the image data according to a depth mode, a remosaic mode and a 2-sum mode, and the 2-sum mode may be a Bayer 2-sum mode.

The depth mode, the remosaic mode and the 2-sum mode are described in detail below with reference to FIGS. 7 to 10.

Figure 7:
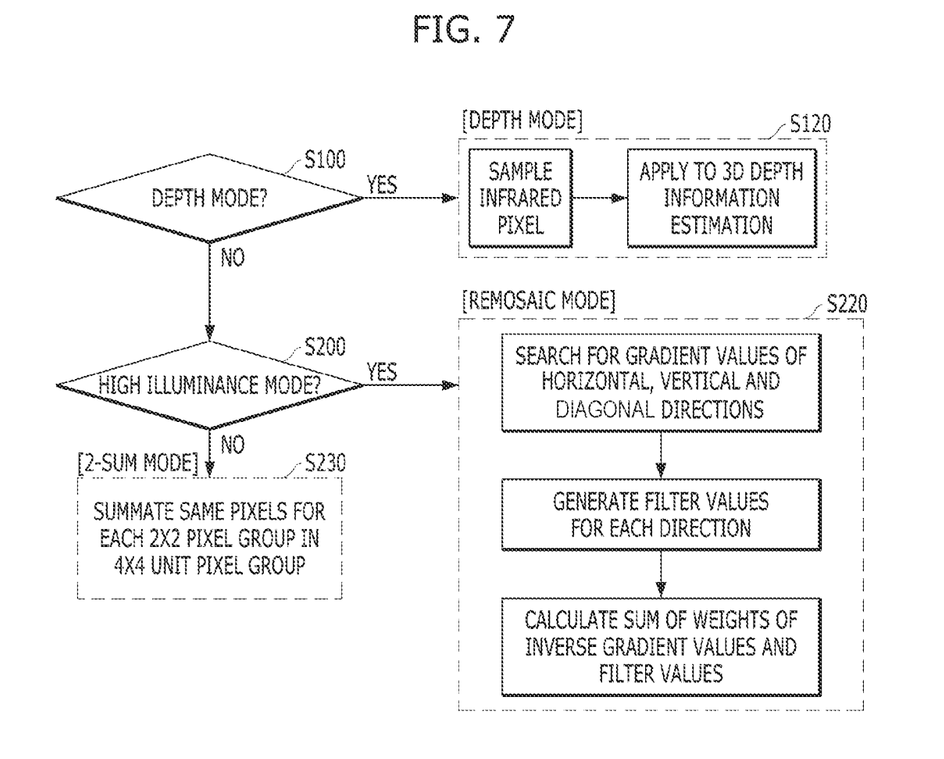
FIG. 7 is a flowchart illustrating a mode operation of an image processing system, in accordance with another embodiment.
Figure 8:
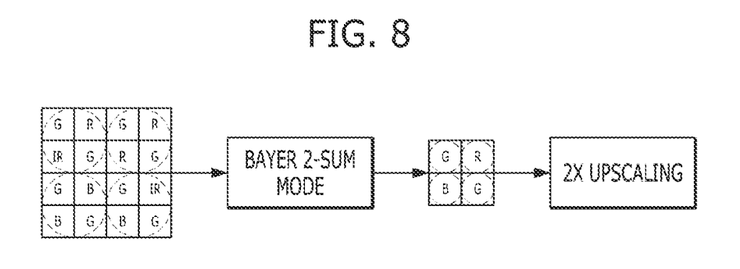
FIG. 8 is a diagram illustrating a 2-sum mode, in accordance with another embodiment.
Figure 9:
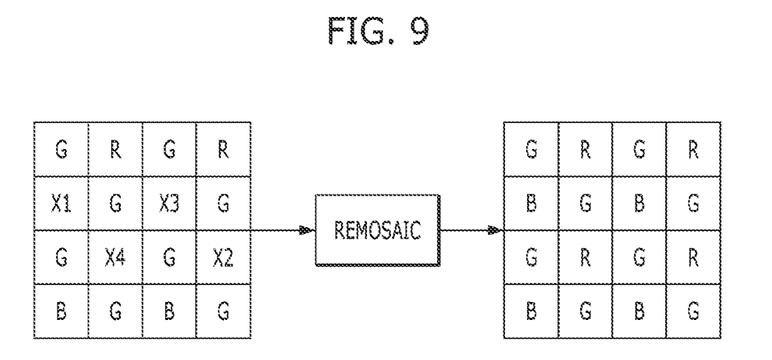
FIG. 9 is a diagram illustrating a remosaic mode, in accordance with another embodiment.
Figure 10:
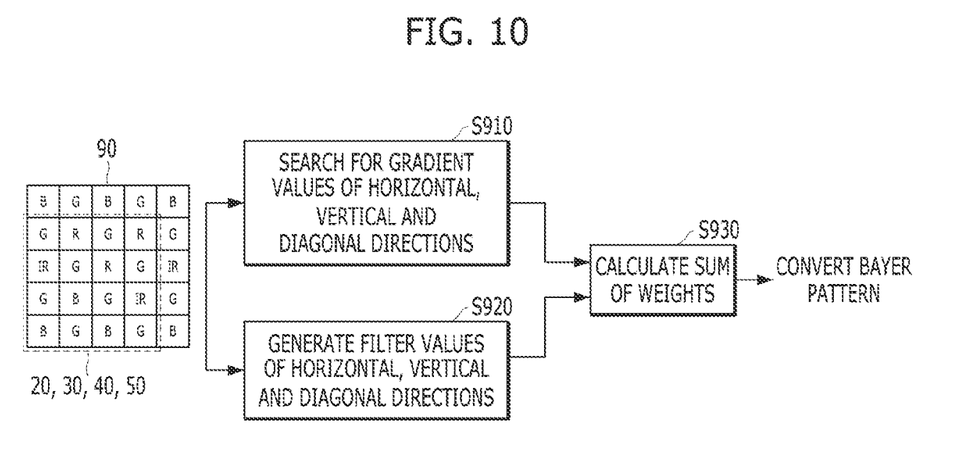
FIG. 10 is a diagram illustrating a remosaic calculating process in a remosaic mode, in accordance with another embodiment.

Hereinafter, an operating method of the image processing system 1000 according to another embodiment of the present disclosure is described with reference to FIGS. 7 to 10. FIG. 7 is a flowchart illustrating a mode operation of the image processing system 1000, in accordance with another embodiment, FIG. 8 is a diagram illustrating the 2-sum mode, in accordance with another embodiment, FIG. 9 is a diagram illustrating the remosaic mode, in accordance with another embodiment, and FIG. 10 is a diagram illustrating a remosaic calculating process in the remosaic mode, in accordance with another embodiment.

Referring to FIG. 7, the mode operation circuit 1210 may determine whether the operation mode is the depth mode, in step S100. When the operation mode is the depth mode, the mode operation circuit 1210 may sample the infrared pixels in the pixel pattern included in the pixel array 1110, and obtain three dimensional (3D) depth information on the basis of the sampled infrared pixels, in step S120.

When the operation mode is not the depth mode, the mode operation circuit 1210 may determine whether the image processing system 1000 is in a high illuminance mode or a low illuminance mode, in step S200. In the high illuminance mode, the mode operation circuit 1210 may execute the remosaic mode, and convert an RGW-IR pattern into a Bayer pattern, in step S220.

In the low illuminance mode in step S230, the mode operation circuit 1210 may execute the 2-sum mode, and, in an embodiment, improve a signal-to-noise ratio (SNR).

For example, in the low illuminance mode in step S230, two same color pixels existing in a 2×2 pixel unit according to the 2-sum mode may be summated, which makes it possible, in an embodiment, to improve the signal-to-noise ratio (SNR) of the two pixels by 3 dB as compared to the signal-to-noise ratio (SNR) of a single pixel, as shown in Equation 1 below.

[Equation 1]

$$SNR_{2pixel}(dB) = 20 \log_{10}\left(\frac{Signal}{Noise}\right) = 20 \log_{10}\left(\frac{2N}{\sqrt{2N}}\right) = 20 \log_{10}\left(\frac{N}{\sqrt{N}}\right) + 3.01 \cong SNR_{1pixel} + 3(dB)$$

Herein, "N" represents the number of electrons measured in one pixel, "$\sqrt{N}$" represents noise, "$SNR_{2pixel}$" represents the signal-to-noise ratio (SNR) of the sum of the two pixels, and "$SNR_{1pixel}$" represents the signal-to-noise ratio (SNR) of the single pixel.

That is, as illustrated in FIG. 8, in the low illuminance mode in step S230, the same color pixels in each of the first to fourth 2×2 pixel groups are summated to implement upscaling, which makes it, in an embodiment, possible to improve the signal-to-noise ratio (SNR) by approximately 3 dB.

In the case of a conventional RGB-IR pattern, one infrared pixel IR is provided in each of first to fourth 2×2 pixels, and thus the same color pixels are not provided in each of the first to fourth 2×2 pixels. Accordingly, the signal-to-noise ratio (SNR) might not be improved by 3 dB in a 2×2 pixel unit.

Referring to FIG. 9, according to the operation of the remosaic mode in step S220, the RGW-IR pattern having different color pixels X1, X2, X3 and X4 from the Bayer pattern may be converted into the Bayer pattern through a remosaic conversion algorithm illustrated in FIG. 10.

Referring to FIG. 10, in a 5×5 input pixel group 90 including the 4×4 unit pixel groups 20, 30, 40 and 50 illustrated in FIGS. 2 to 5, gradient values of horizontal, vertical and diagonal directions may be searched in step S910, filter values of the horizontal, vertical and diagonal directions may be generated in step S920, and weights corresponding to the inverse of the gradient values may be assigned to the filter values in step S930, thereby converting the RGW-IR pattern into the Bayer pattern.

That is, through the remosaic conversion algorithm illustrated in FIG. 10, the first infrared pixel X1 may be converted into a blue pixel B, the second infrared pixel X2 may be converted into a red pixel R, and the red pixel X3 and the blue pixel X4 positioned in the second diagonal direction DR may be converted into the blue pixel B and the red pixel R, respectively.

Since the conversion formula and calculation process of the remosaic conversion algorithm are widely and publicly known, detailed descriptions thereof are omitted.

As described above, the image sensor, the image processing system and the operating method of the image processing system according to the various embodiments of the present disclosure may selectively execute three modes such as the depth mode, the remosaic mode and the 2-sum mode according to the operating conditions, and thus generate the improved image data. In the depth mode, in an embodiment, 12.5% of infrared pixels may be arranged in an RGB Bayer format, and only the infrared pixels may be sampled to obtain depth information. In the high illuminance condition, in an embodiment, the remosaic mode may be executed, which makes it possible to output image data in the Bayer format with the same resolution as image data input, and in the low illuminance condition, in an embodiment, the same color pixels may be summated according to the 2-sum mode, which makes it possible to improve the signal-to-noise ratio (SNR).

That is, it is possible to obtain the depth information and improve the signal-to-noise ratio (SNR) by using one single sensor according to the various embodiments of the present disclosure.

An image sensor, an image processing system and an operating method of the image processing system according to various embodiments of the present disclosure can selectively process three modes according to operating conditions and thus generate improved image data.

In addition, the image sensor, the image processing system and the operating method of the image processing system can, in an embodiment, obtain 3D depth information and improve a signal-to-noise ratio (SNR) by using one single sensor.

Effects obtainable from the present disclosure are not limited to those described above, and other effects not described herein will be apparently understood by those skilled in the art, to which the present disclosure pertains, from the above description.

While the present disclosure has been illustrated and described with respect to specific embodiments, the disclosed embodiments are provided for the description, and not intended to be restrictive. Further, it is noted that the present disclosure may be achieved in various ways through substitution, change, and modification that fall within the scope of the following claims, as those skilled in the art will recognize in light of the present disclosure.

What is claimed is:

1. An image processing system comprising:
an image sensor suitable for sensing an optical image of a subject and outputting image data;
an image processing device suitable for receiving the image data, processing a received image according to a mode operation, and providing an output image; and
a display device suitable for displaying the output image,
wherein the image sensor includes a pixel array comprising a pixel pattern in which one infrared pixel is arranged, the same green pixels are arranged in a first diagonal direction, and red pixels and blue pixels are arranged in half in a second diagonal direction crossing the first diagonal direction, in a 4×4 unit pixel group,
wherein the image processing device includes a mode operation circuit suitable for generating image data in a depth mode, a remosaic mode and a 2-sum mode according to the mode operation,
wherein the mode operation circuit determines whether the image processing system is in the depth mode,
when the image processing system is in the depth mode, the mode operation circuit samples the infrared pixel and obtains 3D depth information on the basis of the sampled infrared pixel,
when the image processing system is not in the depth mode, the mode operation circuit determines whether the image processing system is in a high illuminance mode or a low illuminance mode,
when the image processing system is in the high illuminance mode, the mode operation circuit executes the remosaic mode and converts an RGW-IR pattern into a Bayer pattern, and
when the image processing system is in the low illuminance mode, the mode operation circuit executes the 2-sum mode and improves a signal-to-noise ratio.

2. The image processing system of claim 1, wherein one infrared pixel is arranged in each of the first 2×2 pixel group and the third 2×2 pixel group that are not adjacent to each other among the first to fourth 2×2 pixel groups, the green pixels arranged in the first diagonal direction to be adjacent to the infrared pixel are included in the first 2×2 pixel group and the third 2×2 pixel group, and the red pixels and the blue pixels arranged in half in the second diagonal direction are included in the second 2×2 pixel group and the fourth 2×2 pixel group, respectively, or the fourth 2×2 pixel group and the second 2×2 pixel group, respectively.

3. The image processing system of claim 1, wherein one infrared pixel is arranged in each of the second 2×2 pixel group and the fourth 2×2 pixel group that are not adjacent to each other among the first to fourth 2×2 pixel groups, the green pixels arranged in the second diagonal direction to be adjacent to the infrared pixel are included in the second 2×2 pixel group and the fourth 2×2 pixel group, and the red pixels and the blue pixels arranged in half in the first diagonal direction are included in the first 2×2 pixel group and the third 2×2 pixel group, respectively, or the third 2×2 pixel group and the first 2×2 pixel group, respectively.

4. An image processing system comprising:
an image sensor suitable for sensing an optical image of a subject and outputting image data;
an image processing device suitable for receiving the image data, processing a received image according to a mode operation, and providing an output image; and
a display device suitable for displaying the output image,
wherein the image sensor includes a pixel array comprising a pixel pattern in which one infrared pixel is arranged, the same green pixels are arranged in a first diagonal direction, and red pixels and blue pixels are arranged in half in a second diagonal direction crossing the first diagonal direction, in a 4×4 unit pixel group,
wherein the image processing device includes a mode operation circuit suitable for generating image data in a depth mode, a remosaic mode and a 2-sum mode according to the mode operation,
wherein in the remosaic mode, first infrared pixel is converted into a blue pixel, second infrared pixel is converted into a red pixel, the blue pixels positioned in the second diagonal direction are converted into red pixels, and the red pixels positioned in the second diagonal direction are converted into blue pixels.

5. An image processing system comprising:
an image sensor suitable for sensing an optical image of a subject and outputting image data;
an image processing device suitable for receiving the image data, processing a received image according to a mode operation, and providing an output image; and
a display device suitable for displaying the output image,
wherein the image sensor includes a pixel array comprising a pixel pattern in which one infrared pixel is arranged, the same green pixels are arranged in a first diagonal direction, and red pixels and blue pixels are arranged in half in a second diagonal direction crossing the first diagonal direction, in a 4×4 unit pixel group,
wherein the image processing device includes a mode operation circuit suitable for generating image data in a depth mode, a remosaic mode and a 2-sum mode according to the mode operation,
wherein in the 2-sum mode, the same color pixels are summated in each of the first to fourth 2×2 pixel groups, and upscaling is implemented.

6. An image processing system comprising:
an image sensor suitable for sensing an optical image of a subject and outputting image data;
an image processing device suitable for receiving the image data, processing a received image according to a mode operation, and providing an output image; and
a display device suitable for displaying the output image,
wherein the image sensor includes a pixel array comprising a pixel pattern in which one infrared pixel is arranged, the same green pixels are arranged in a first diagonal direction, and red pixels and blue pixels are arranged in half in a second diagonal direction crossing the first diagonal direction, in a 4×4 unit pixel group,
wherein the image processing device includes a mode operation circuit suitable for generating image data in a depth mode, a remosaic mode and a 2-sum mode according to the mode operation,
wherein in the remosaic mode, gradient values and filter values of a horizontal direction, a vertical direction and a diagonal direction are generated, and weights corresponding to the inverse of the gradient values are assigned to the filter values to convert an RGW-IR pattern into a Bayer pattern, in a 5×5 input pixel group including the 4×4 unit pixel group.

7. An operating method of an image processing system including an image sensor, the operating method comprising:
determining whether the image processing system is in a depth mode, and sampling an infrared pixel in a pixel pattern of a pixel array included in the image sensor and obtaining three dimensional (3D) depth information on the basis of the sampled infrared pixel when the image processing system is in the depth mode;

determining whether the image processing system is in one of a high illuminance mode and a low illuminance mode when the image processing system is not in the depth mode, and executing a remosaic mode and converting an RGW-IR pattern into a Bayer pattern in the high illuminance mode; and executing a 2-sum mode and generating a signal-to-noise ratio in the low illuminance mode, wherein the pixel pattern has a 4×4 unit pixel group in which first to fourth 2×2 pixel groups are arranged in a clockwise direction, a first infrared pixel and a second infrared pixel are arranged in two 2×2 pixel groups, respectively, that are not adjacent to each other, the same green pixels are arranged in a first diagonal direction, and red pixels and blue pixels are arranged in half in a second diagonal direction crossing the first diagonal direction, wherein in the remosaic mode, gradient values and filter values of a horizontal direction, a vertical direction and a diagonal direction are generated, and weights corresponding to the inverse of the gradient values are assigned to the filter values to convert the RGW-IR pattern into the Bayer pattern, in a 5×5 input pixel group including the 4×4 unit pixel group.

8. The operating method of claim 7, wherein in the remosaic mode, the first infrared pixel is converted into a blue pixel, the second infrared pixel is converted into a red pixel, the blue pixels positioned in the second diagonal direction are converted into red pixels, and the red pixels positioned in the second diagonal direction are converted into blue pixels.

9. The operating method of claim 7, wherein in the 2-sum mode, the same color pixels are summated in each of the first to fourth 2×2 pixel groups, and upscaling is implemented.

* * * * *